United States Patent

[11] 3,581,445

| [72] | Inventor | Ralph E. Price<br>Waynesboro, Pa. |
|---|---|---|
| [21] | Appl. No. | 831,828 |
| [22] | Filed | June 10, 1969 |
| [45] | Patented | June 1, 1971 |
| [73] | Assignee | Litton Industries, Inc.<br>Beverly Hills, Calif. |

[54] FEED RATE AND WORK SPEED CONTROL FOR GRINDERS
20 Claims, 7 Drawing Figs.

[52] U.S. Cl. .................................................. 51/165, 51/134.5
[51] Int. Cl. ........................................................ B24b 49/00
[50] Field of Search ........................................... 51/134.5, 165, 165.01, 165.03, 165.04, 165.045, 165.07, 165.16, 165.17, 165.18, 165.20, 165.21

[56] References Cited
UNITED STATES PATENTS

| 2,056,871 | 10/1936 | Silven ........................... | 51/134.5 |
| 2,783,595 | 3/1957 | Hill .............................. | 51/134.5X |
| 3,193,976 | 7/1965 | Luebkemann ................. | 51/165 |
| 3,466,976 | 9/1969 | Price ........................... | 51/165 |

Primary Examiner—Lester M. Swingle
Attorney—Diller, Brown, Ramik & Holt

ABSTRACT: This disclosure relates to a grinder for grinding workpieces having two or more different diameters and having means for presetting the controls of the grinder to grind such different diameters. In addition, the grinder is provided with means for preselecting the feed rate and work speed for each diameter. Preselecting of the feed rate is done by means of a punched card which also controls the positioning of the grinding wheel to grind the preselected diameter. The work speed is determined generally by the diameter of the workpiece portion to be ground.

INVENTOR
RALPH E. PRICE

BY Diller, Brown, Ramik & Holt

ATTORNEYS

INVENTOR
RALPH E. PRICE

BY Diller, Brown, Ramik & Holt

ATTORNEYS

INVENTOR
RALPH E. PRICE

ATTORNEYS

FEED RATE AND WORK SPEED CONTROL FOR GRINDERS

This invention relates in general to new and useful improvements in a control system for providing a variable feed rate and a variable work speed rate for a machine tool, particularly a machine tool for machining workpieces having two or more different diameters and having means for preselecting the feed rate and work speed for each diameter, and more particularly for a grinding machine where the feed and work speed rates are automatically determined in accordance with the diameters of the workpiece portions, which are programmed by a card reader.

Prior to this invention, a single grinding feed rate was used for all work diameters until an increment feed or fine feed rate was effected just before feed completion. The work speed was regulated by changing the motor speed or the drive pulleys and belts. A combined AC and DC control unit was sometimes used, which control unit includes a rectifier and a speed potentiometer to change the work speed rate. However, the rates could not be interconnected nor regulated by a single control element.

In accordance with this invention, means are provided for controlling the feed rate and the work speed rate of a grinding machine. The grinding wheel is advanced at a variable feed rate for grinding different workpiece diameters automatically. Controls are also included to regulate the variable work speed rate by preselecting the diameter range independently from the adjustable feed range. The variable work speed range may also be effected by the variable rate of infeed which is controlled by a punch card or other preselected devices.

It will be readily apparent that when a workpiece having different diameter portions is to be ground, it is highly desirable that a production tool be automatically adjusted rapidly to provide a rapid rate of rotation for a small diameter and a proportional reduction in the driving speed for a larger diameter so as to provide the proper surface speed for the optimum rate of stock removal. It is also desirable that the rate of infeed during the plunge grinding operation should also be proportional with respect to the diameter of the workpiece.

In accordance with the foregoing, it is an object of this invention to provide a control mechanism which includes means to set the grinder by means of a prepunched card programmer to automatically effect the optimum grinding wheel infeed rate and the most effective work speed rate.

Another object of this invention is to improve the finish of a workpiece by providing the correct surface speeds within a specified range of the different size workpiece portion diameters to be ground.

Still another object of this invention is to increase the life of the grinding wheel by maintaining the proper rate of feed to correspond to the rotating speed and diameter of the workpiece portion being ground.

With the above and other objects in view that will hereinafter appear, the nature of the invention will be more clearly understood by reference to the following detailed description, the appended claims and the several views illustrated in the accompanying drawings:

It is pointed out here that although this invention may be utilized for effecting a plurality of feed rates and the most efficient work speed rates for various machine tools, the invention is primarily applicable to grinding machines, and therefore, it will be described in conjunction with a grinding machine.

Figure 1:
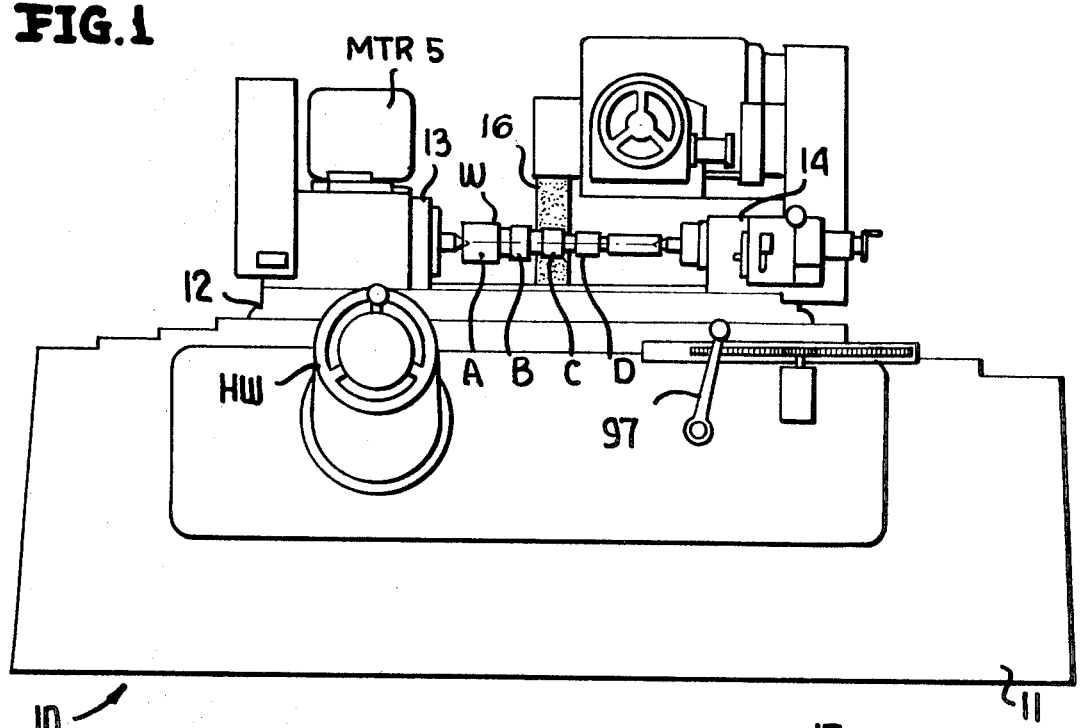
FIG. 1 is a front elevational view of a grinding machine in accordance with this invention and shows generally the overall details thereof.
Figure 2:
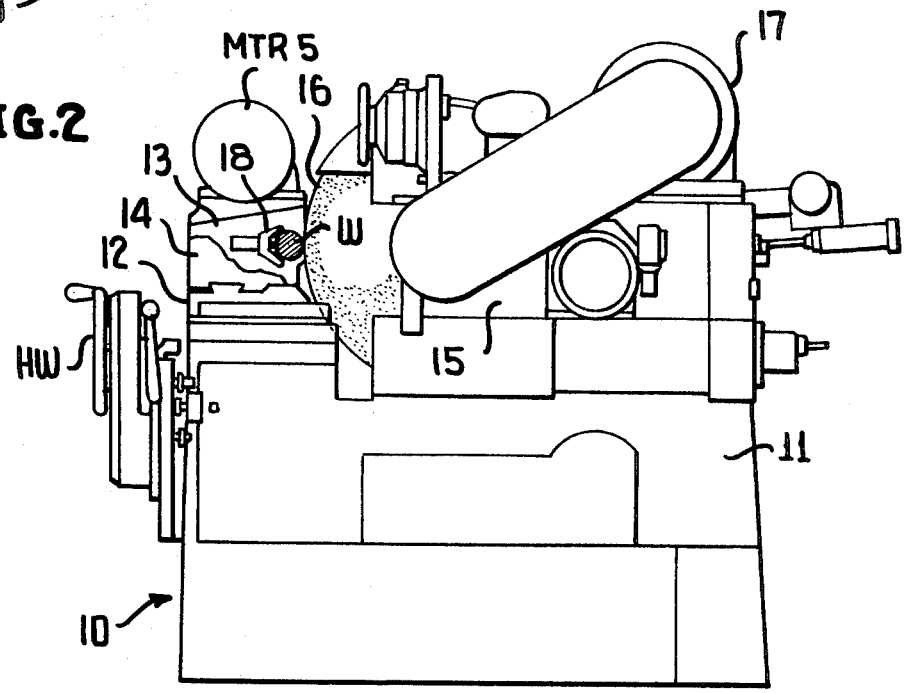
FIG. 2 is an end elevational view of the grinding machine taken from the right of FIG. 1.

Referring now to the drawings in detail, it will be seen that there is illustrated in FIGS. 1 and 2 a grinding machine to which this invention is applied, the grinding machine being generally referred to by the numeral 10. The grinding machine 10, except for the specific feed mechanism, the variable workpiece rotational speed drive means, and the controls therefor, is of a convention construction and includes a bed 11. The bed 11 has mounted thereon in a conventional manner for a longitudinal sliding movement a work carriage or support 12. At one end of the work support 12, there is mounted a headstock 13 which is suitably driven by an adjustable frequency motor MTR5 having a control unit to regulate the work speeds. At the opposite end of the work support 12, there is mounted a conventional type of tailstock 14.

A workpiece W is mounted between the headstock 13 and the tailstock 14 for rotation about a predetermined axis by the driven headstock 13 and for longitudinal shifting with the work support 12. Longitudinal shifting of the work support 12 may be effected by the handwheel HW through a driving mechanism (not shown) mounted within the bed 11. It is to be noted that the workpiece W has a plurality of portions A, B, C, and D which are of different dimension and are located at specific distances from the headstock 13.

A grinding wheel support or wheelhead 15 is slidably mounted on the bed 11 for controlled movement transversely of the work support 12 in a conventional manner. A grinding wheel 16 is carried by the wheel support 15 for rotation in a conventional manner and is driven by means of an electric motor 17.

The grinding wheel 16 is fixed longitudinally of the bed 11, but is shiftable transversely of the bed 11 both for the purpose of grinding different diameters on workpieces and to compensate for variations in the diameter of the grinding wheel 16. With the grinding wheel 16 in a retracted position, the workpiece W will be positioned longitudinally of the bed 11 to position one of the portions thereof in alignment with the grinding wheel 16.

After the workpiece portion W has been properly positioned in alignment with the grinding wheel 16, the grinding wheel is advanced towards the workpiece to perform the grinding operation.

Figure 3:
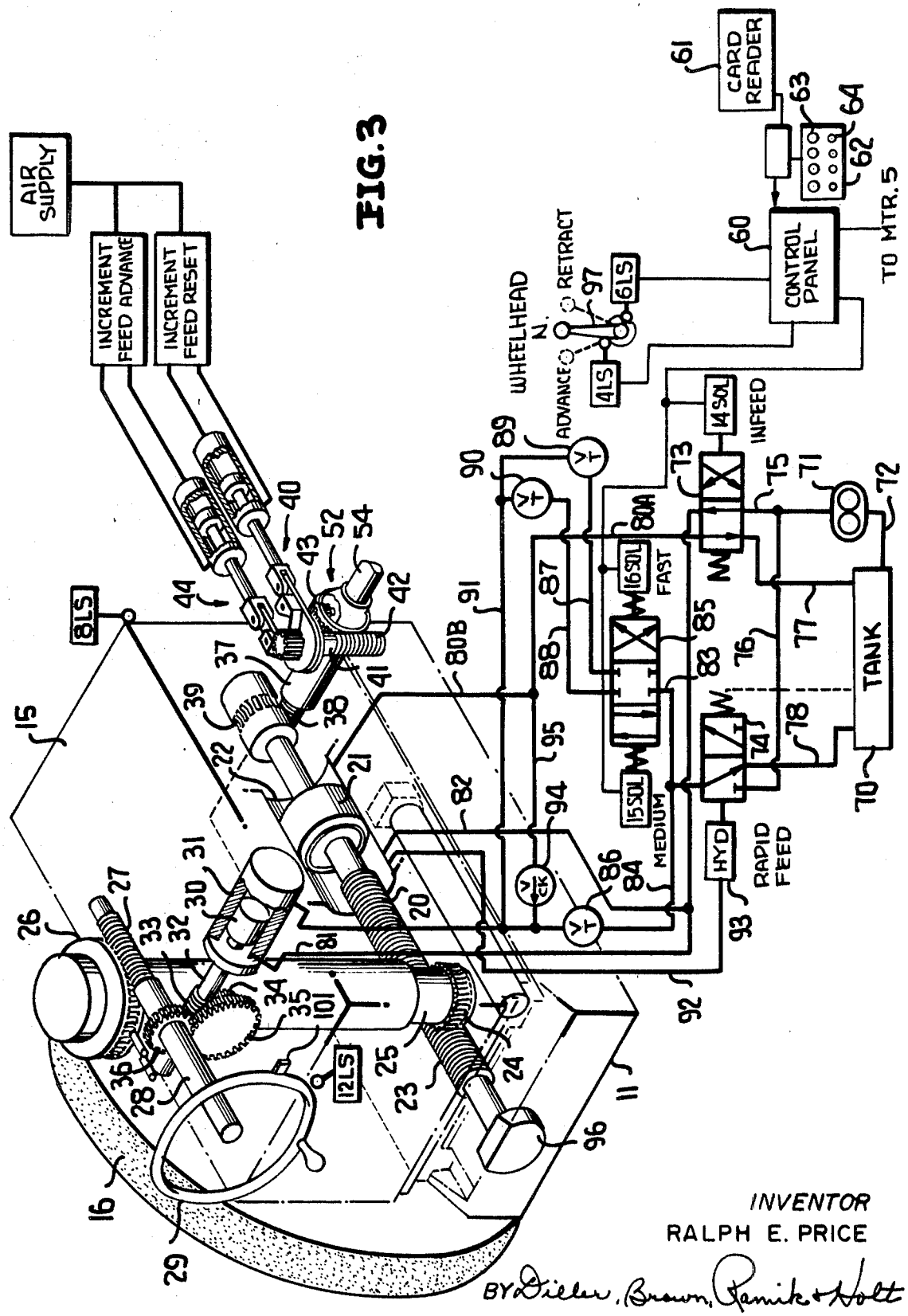
FIG. 3 is a perspective view of the feed mechanism for the grinding wheel supporting slide with there being schematically illustrated the control system for the feed mechanism.

Referring now to FIG. 3, it will be seen that the grinder 10 includes a feed mechanism for advancing and retracting the wheelhead 15. The feed mechanism includes a feed screw 20 which is slidably mounted in the bed 11 and carries a piston 21 which is mounted within a cylinder 22 to effect the rapid advancing and retracting movements of the feed screw 20. The feed screw 20 is in threaded engagement with a worm wheel 24 formed in the lower end of a vertical shaft 25. At the upper end of the shaft 25, there is positioned another worm wheel 26 which is in operative engagement with a worm 27 carried by a handwheel shaft 28 which supports a forwardly facing handwheel 29. The shaft 28 may be selectively rotated by either the handwheel 29 or by means of a piston 30 which is mounted within a cylinder 31. At this time it is pointed out that the piston 30 and the cylinder 31 combine to form what may be considered as an extensible hydraulic motor. The piston 30 has coupled thereto by means of a piston rod 32, a rack member 33 which is meshed with a pinion 34. The pinion 34 is directly coupled to a gear 35 which is suitably mounted for rotation within the wheelhead 15 and which, in turn, is meshed with a gear 36 carried by the shaft 28.

The feed screw 20 may be utilized for advancing and retracting the wheelhead 15 by being rotated. This is accomplished by means of a shaft 37 having a worm 38 which is meshed with a worm wheel 39 carried by the feed screw 20. A further feed mechanism, generally referred to by the numeral 40, is provided for effecting the rotation of the shaft 37.

The feed mechanism 40 is an incremental mechanism and includes a shaft 41 having formed on one end thereof a worm 42 which is meshed with a worm wheel 43 which is coupled to the shaft 37 in a manner to be described hereinafter.

The shaft 41 is selectively incrementally turned by means of a ratchet drive mechanism which is generally referred to by the numeral 44. The ratchet drive mechanism 44 is conventional and is adapted to rotate the shaft 41 in either of two directions as is automatically called for by control means of the grinding machine. If more information is desired with respect to the ratchet mechanism 44, one's attention is directed to U.S. Pat. Nos. 3,046,706 granted July 31, 1962 and U.S. Pat. No. 3,047,988, granted Aug. 7, 1962.

The shaft 37 is also rotatable by means of a shaft 54 so as to set the feed mechanism for the wheelhead 15 to grind different diameters automatically. The means for rotating the shaft 54 to position the grinding wheel 16 to grind a specific selected diameter is not a part of this invention and is therefore, not shown here. It is, however, pointed out that the shaft 54 is coupled to a differential drive unit, which is generally identified by the numeral 52 and of which the worm wheel 43 is a part whereby the shaft 37 may be turned either by the shaft 41 or the shaft 54 without interrupting the setting of the nonoperative shaft of the shafts 41 and 54. If further details of the differential drive unit 52 and the shaft 54 are desired, they may be found in my copending application Ser. No. 580,000, filed Sept. 16, 1966, now U.S. Pat. No. 3,466,976, dated Sept. 16, 1969.

GENERAL MECHANICAL OPERATION

In the conventional operation of the feed mechanism for the wheelhead 15, rapid feeding thereof is effected by moving the feed screw 20 axially by means of the piston 21. The threads of the feed screw 20 engage the teeth of worm wheel 24 so that the shaft 25 and the wheelhead 15 move as a unit with the feed screw 20.

At the end of the rapid feed movement, when the piston 21 reaches the end of its travel, the grinding feed is effected by movement of the piston 30 to the left, causing rotation of the handwheel 29, shaft 28 and worm 27. The worm 27 serves to rotate worm wheel 26 to effect rotation of the shaft 25 which is rotatably mounted within the wheelhead 15. As the worm wheel 24 rotates, it functions as a pinion in engagement with threads 23 of feed screw 20 and advances the wheelhead 15 relative to the feed screw 20 for the grinding operation.

At the end of the movement of the piston 30, the fine increment feed mechanism 40 is initiated to drive the shaft 37 through the differential drive unit 52. The rotation of the shaft 37 results in the rotation of the feed screw 20 through the worm 38 and the worm wheel 39. As the feed screw 20 rotates, wormwheel 24 functions as a nut and serves to advance the shaft 25 and the wheelhead 15 relative to the feed screw 20 to finish grind a workpiece until a suitable size control devices, such as the caliper 18 of FIG. 2, signals that the portion of the workpiece W being ground has been ground to the desired diameter. At this time, the end of the grinding operation has been reached.

It is pointed out that the rotation of the feed screw 20 is utilized only for fine feed to minutely reduce the diameter of the workpiece to the preselected dimension and in no way effects the setting of the feed mechanism for a specific diameter. This is accomplished primarily by rotating the shaft 54 so as to preset the relationship of the wheelhead 15 with respect to the feed screw 20.

It is pointed out here that the caliper 18 is of a construction so as to measure workpieces of different diameters within a predetermined range. The caliper 18 is of a type which includes a probe which is engageable with a workpiece and is connected to the core of a transducer mounted in the housing of the caliper 18. The caliper 18, which is convention, may be formed in accordance with U.S. Pat. No. 3,157,971, granted Nov. 24, 1964, or may be of any other suitable construction.

Reference is not made to FIG. 3 wherein it is to be noted that the control mechanism includes a control panel 60 which has coupled thereto a card reader 61 and a combination device 62, the combination device 62 including a visual indicator 63 and dimension setting switches 64. By utilizing in a conventional manner either the card reader 61, employing a punched card, or by setting the switches 64, the diameter of a workpiece portion to be ground may be preset.

Figure 7:
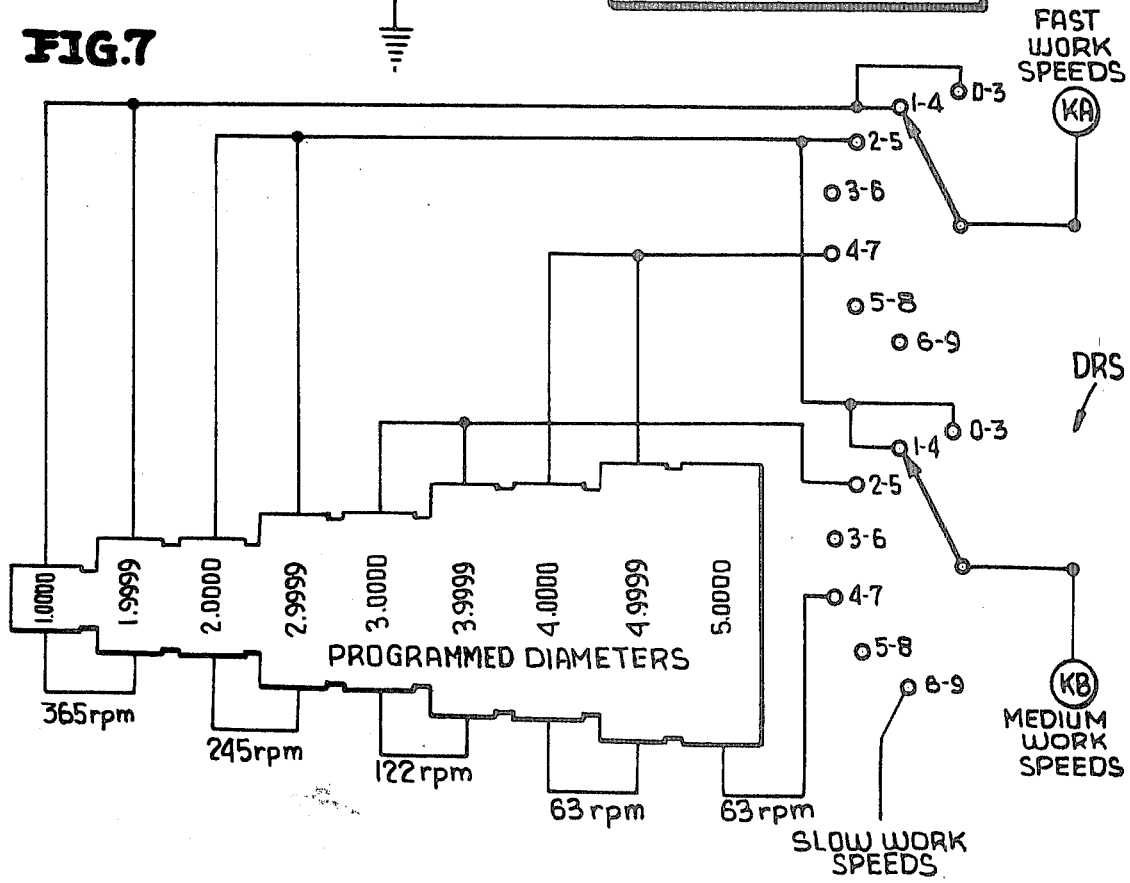
FIG. 7 is a diagram of a rotary switch which is preset to cover the range of the workpiece diameters.

Referring now to FIG. 7 in particular, there is diagrammatically illustrated the details of a diameter range switch which is identified as switch DRS. The diameter range switch DRS has associated therewith relays KA and KB and is settable in accordance with the dimension range of the workpiece. In the illustrated setting of FIG. 7, the diameter range switch DRS is set for a range of from 1 inch diameter to 4 inches diameter workpieces. It is to be noted that with this setting of the switch DRS, if the workpiece portion to be ground is below 2.0000 inch, the relay KA will be energized. On the other hand, if the diameter of the workpiece portion to be ground is 2.0000 inch, but less than 3.0000 inch, then the relay KB will be energized. If the workpiece diameter is between 3.0000 and 4.0000 inch, then neither of the relays KA or KB will be energized and the work will be driven at a low speed in a manner to be described in detail hereinafter.

It is to be noted that the diameter range switch DRS is settable for dimension ranges from 0 to 3 inch up to 6 to 9 inch. However, the schematic connections of the switch DRS to the related workpiece are illustrated only for ranges of 0—3 inch, 1—4 inch, 2—5 inch and 4—7 inch. In addition, it is shown that if the workpiece diameter is in the range of 6—9 inches, the workpiece will always be driven at slow work speeds.

Although four different work speeds have been shown in FIG. 7 in addition to the slow work speed, it is to be understood that the drive for the headstock 13 will only provide two speeds in addition to the slow work speed. Other ranges may be accomplished by changing the ratio of the drive between the motor MTR5 and the center or other driving element of the headstock 13.

Reference is now made to FIG. 3 with respect to the hydraulic system for controlling the infeeding of the wheelhead 15. The hydraulic system includes a supply tank 70 which has a pump 71 coupled thereto by means of a line 72. The pump 71 is, in turn, connected to spring-loaded valves 73 and 74 by lines 75 and 76, respectively. The valves 73 and 74 are connected to the tank by return lines 77 and 78, respectively.

The valve 73 is connected to the cylinder 22 by lines 80A and 80B and to the cylinder 31 by a line 81. A line 82 branches from the line 81 and is connected to the cylinder 22 at the opposite end thereof remote from the connection of the line 80B.

The valve 74 has coupled thereto lines 83 and 84 which are connected to a valve 85 and to the cylinder 31 at the ends thereof remote from the line 81. It is to be noted that the line 84 has coupled therein a throttle valve 86 for controlling the flow of hydraulic fluid from the valve 74 to the cylinder 31. The valve 85 also has lines 87 and 88 leading therefrom in which there are positioned throttle valves 89 and 90, respectively. The lines 87 and 88 are connected to a line 91 which is coupled to the line 84 intermediate the throttle valve 86 and the cylinder 31.

At this time it is pointed out that the throttle valve 86 is adjusted to have a very low flow rate so as to provide for a slow movement of the piston 30. The throttle valve 90 is adjusted so that the flow therethrough, plus the flow through the throttle valve 86, provides for a medium rate of movement of the piston 30. The throttle valve 89 is adjusted so that the flow therethrough, plus the flow through the throttle valve 86 will be such so as to provide for a fast rate of movement of the piston 30.

The hydraulic system also includes a line 92 which is connected to the cylinder 22 adjacent the connection of the line 82 thereto. The line 82 is connected to a hydraulic actuator 93 for the valve 74.

It will be readily apparent from FIG. 3 that the valves 73, 74 and 85 are spring loaded with the valve 85 being spring loaded at each end and having a neutral position therebetween. In the normal positions of the three valves, flow from the pump 71 is through the valve 73 and the lines 81 and 82 to the cylinders 31 and 22, respectively, to urge the pistons 30 and 21 to their retracted positions. Return flow from the cylinder 22 is through the lines 80B and 80A, the valve 73 and the return line 77 to the tank. Return flow from the cylinder 31 is through the line 84.

It is to be noted that the valve 73 has associated therewith a solenoid 14SOL while the valve 85 has associated therewith solenoids 15SOL and 16SOL. The solenoids are electrically connected to the control panel in a manner diagrammatically shown in FIG. 3.

When the solenoid 14SOL is energized, the valve 73 is shifted to the left so as to direct hydraulic fluid under pressure into the line 80A. The hydraulic fluid flows from line 80A through line 80B to the right end of the cylinder 22, forcing the piston 21 to the left to effect rapid forward movement of the wheelhead 15. At the same time, hydraulic fluid is discharged from the left end of the cylinder 22 through the line 82, valve 73 and line 77 to the tank 70. At the same time, hydraulic fluid is forced into the line 92 to actuate the hydraulic actuator 93 to hold the valve 74 to the right rendering the same inoperative.

The hydraulic infeed continues until the piston 21 is advanced to a position where the feed screw 20 reaches a positive stop 96. At this time fluid stops being discharged from the cylinder 22 and the hydraulic actuator 93 is rendered ineffective. The valve 74 is then moved to the left by spring pressure which permits hydraulic fluid from the pump 71 to be directed through the valve 74 into the lines 83 and 84. When the valve 85 is in its central position, fluid flow is only through the line 84 through the throttle valve 86 to the cylinder 31 so as to slowly move the position 30 to the left and thereby a slow grinding feed is effected until feed completion of the wheelhead 15 and the grinding wheel 16 is obtained.

When the solenoid SOL 15 is energized, the valve 85 is moved to the right and in addition to fluid flowing through the line 84 and the throttle valve 86 into the cylinder 31, fluid flows through the line 83 through the valve 85, the line 88, throttle valve 90 and line 91 into the cylinder 31. It is to be understood that the combined flow through the throttle valves 86 and 90 will result in the piston 30 moving at a medium rate.

When the solenoid 16 SOL is energized, the valve 85 will move to the left, with the result that in addition to fluid flow through the throttle valve 86, there will be fluid flow through the valve 85, the line 87, throttle valve 89 and line 91 to the cylinder 31. The combined flow of fluid to the cylinder 31 through the throttle valves 86 and 89 will result in a fast feed rate.

OPERATION

It is to be understood that the proper infeed rate is automatically selected by placing a prepunched card (not shown) in the card reader 61 when the control panel 60 is preset for the automatic grinding cycle.

It is to be understood that the machine cycle is arranged to provide a slow grinding feed rate when a large diameter is to be ground, a medium grinding feed rate when an intermediate diameter is to be ground, and a fast grinding feed rate when a small diameter is to be ground.

Figure 4:
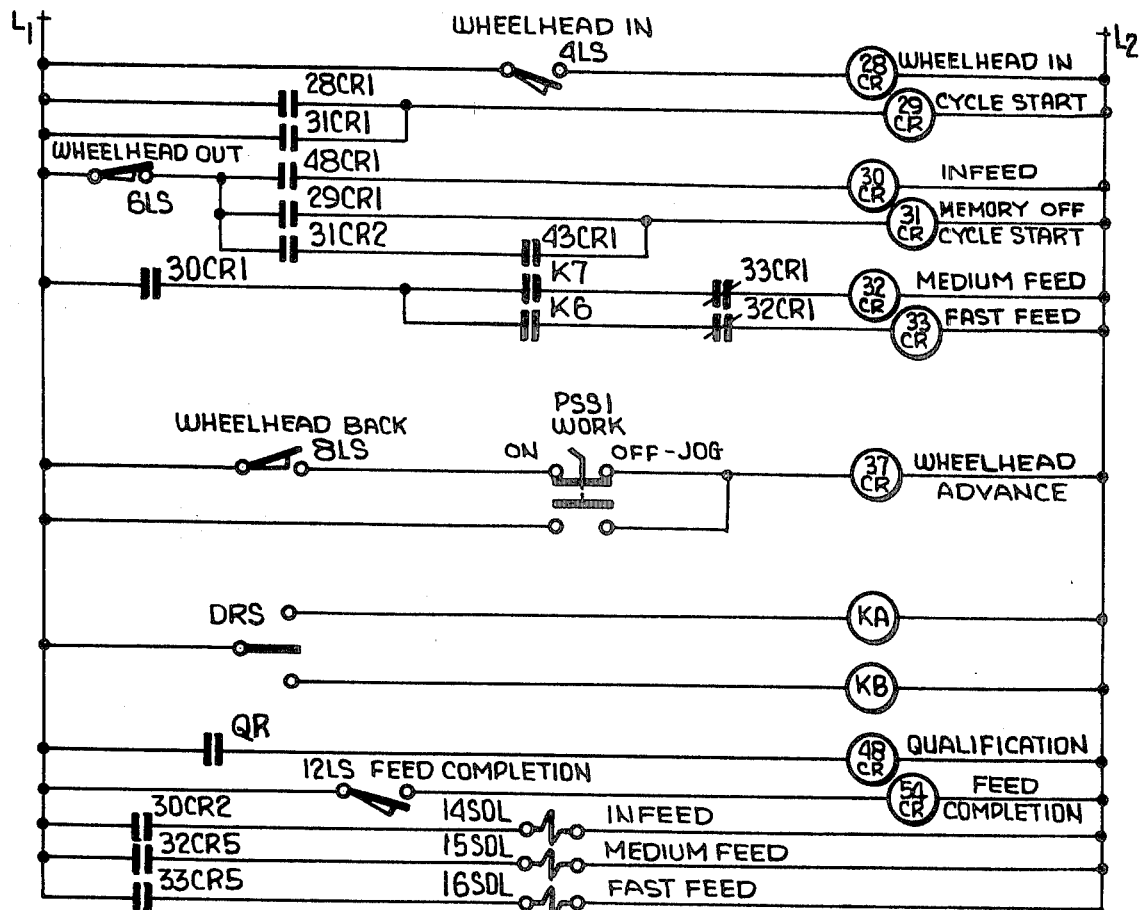
FIG. 4 is a circuit diagram of the control circuit for the operation of the feed mechanism.

With reference to FIG. 4, it is to be understood that contacts K7 and K6 are selectively closed by the function of the card reader 61 at the beginning of the automatic cycle or when changing from one size diameter range to another to determine the feed rate which is automatically controlled by the positioning of the valve 85.

When a small diameter is programmed into the card reader 61, the contact K6 closes to effect a fast grinding feed rate. On the other hand, when an intermediate diameter range is programmed into the card reader 61, the contact K7 closes to effect a medium grinding feed rate. A slow grinding feed rate will automatically be effected when a large diameter is programmed into the card reader 61.

It is also to be understood that the work rotation rate is automatically controlled to provide the proper rotation for each diameter range to maintain the proper surface speeds. The switch DRS serves to selectively energize relays KA and KB to provide for the desired motor speed and means (not shown) are provided for varying the drive ratio between the motor MTR5 and the headstock 13.

The operation of the grinding machine 10 starts when the infeed lever 97 is moved from its neutral central position to the left to its advance position, closing switch 4LS (FIG. 3). As is shown in the wiring diagram of FIG. 4, when switch 4LS closes, wheelhead-in relay 28CR is energized. Contact 28CR1 then closes to energize cycle start relay 29CR to start the machine cycle.

Contact 29CR1 closes to energize relay 31CR to provide a memory of the starting cycle as limit switch 6LS is normally closed. It is to be noted that limit switch 6LS is operated by a cam on the infeed lever 97 (FIG. 3) and is normally closed when the lever 97 is in either its neutral or advance position. Limit switch 6LS opens when lever 97 is in the retract position to effect retraction of the wheelhead 15.

Contact 31CR1 closes to provide a holding circuit around contact 28CR1 for cycle start relay 29CR. Contact 31CR2 closes to provide a holding circuit for relay 31CR through contact 43CR1 which is closed from a signal programmed on the punched card. At this time it is pointed out that the caliper 18 is normally in a retracted position and is now momentarily lowered and advanced into position against the workpiece portion to be ground in order to assure that the workpiece portion to be ground is of the proper diameter for the programmed setting of the diameter to be ground. The manner in which the caliper 18 is moved into engagement with the workpiece to qualify the workpiece is not a part of this invention and is not specifically disclosed herein. It is to be understood that it may be accomplished in any desired manner.

If the workpiece diameter to be ground is within the preset range, gauge contact QR closes to energize qualification relay 48CR. Contact 48CR1 closes to energize infeed relay 30CR since limit switch 6LS is closed due to the lever 97 being in its advance position.

Contact 30CR1 closes to set the feed rate for the wheelhead 15 as determined by the card reader 61. Contact 30CR2 closes to energize solenoid 14SOL to thereby position the valve 73 to direct hydraulic fluid under pressure from the pump 71 to the cylinder 22. Piston 21 is advanced to effect the forward movement of the wheelhead 15.

It is to be understood that the wheelhead 15 is first advanced by means of the piston 21. The wheelhead 15 advances under the influence of the piston 21 until the feed screw 20 engages the positive stop 96. Thereafter, the valve 74 is shifted to a position to direct fluid into the cylinder 31 through the throttle valve 86. As mentioned above, this will automatically provide for a slow plunge feed of the wheelhead 15 and the associated grinding wheel 16.

If the card reader 61 is set to call for a medium grinding feed rate, contact K7 will be closed and relay 32CR energized. Contact 32CR5 will close to energize solenoid 15 SOL which will position the valve 85 to direct additional fluid into the cylinder 31 through the throttle valve 90 to produce a medium grinding feed rate. On the other hand, if the programming of the grinding machine calls for a fast grinding feed rate, contact K6 will be closed energizing relay 33CR. Contact 33CR5 closes to energize solenoid 16SOL which results in the shifting of the valve 85 to the left to direct fluid into the cylinder 31 through the throttle valve 89.

It is to be noted from FIG. 3 that there is a limit switch 8LS which is positioned to close when the wheelhead 15 starts to advance to energize the wheelhead advance relay 37CR when the push button selector switch PSS1 is in its On position to effect rotation of workpiece W. At this time it is pointed out that the switch PSS1 may be shifted to an Off-Jog position to effect jogging of the workpiece when the wheelhead 15 is in the rear position.

Figure 5:
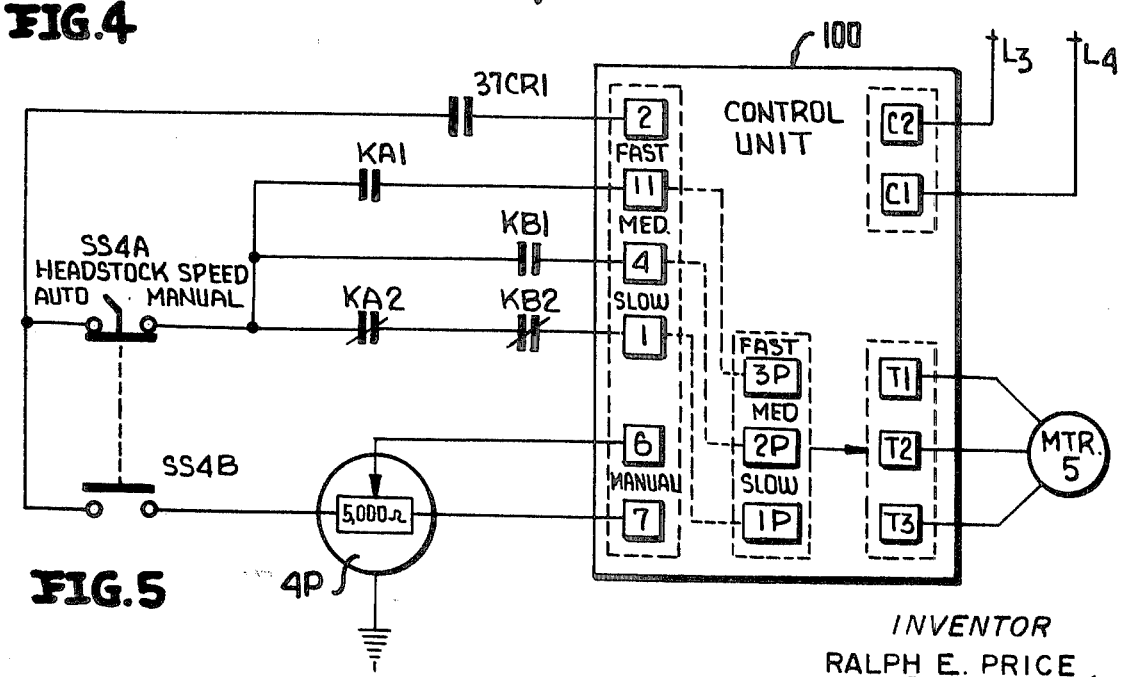
FIG. 5 is a circuit diagram of the work speed control in accordance with the diameter of the workpiece portion.

Referring now to FIG. 5 in particular, it will be seen that the motor MTR5 is controlled by a control unit 100. The control unit is a conventional purchased controller and may be any one of several on the market. A typical controller is one manufactured by Ramsey Controls, Inc. Mahwah, New Jersey, having a 230 volt, single phase, 60 cycle input with a 220 volt, three phase, 30, 60 and 90 cycle output. The control unit 100 is operable to operate a standard squirrel cage motor (6 pole) at 600 r.p.m. on 30 cycle, 1200 r.p.m. on 60 cycle and 1,800 r.p.m. on 90 cycle.

It is to be understood that the control unit 100 has a number of terminals, but only those required for the description of the invention have been specifically illustrated. Input lines L3 and L4 are connected to terminals C2 and C1, respectively. The motor MTR5 is connected to terminals T1, T2 and T3.

When circuit relay 37CR closes, contact 37CR1 closes to connect terminal 2 of the control unit 100 to the headstock speed control switch SS4 which, when it is in its "A" position, provides for the automatic control of the speed of the motor MTR5. Referring back to FIG. 4, it will be seen that when the switch DRS is in its neutral position, neither of the relays KA and KB are energized. Therefore, when the switch DRS is set for a slow work rotating speed, a circuit is completed between terminals 2 and 1 through the normally closed contacts KA2 and KB2. Motor MTR5 is then operated at a frequency which is controlled by potentiometer 1P which effects a slow speed rate.

It is will be apparent from FIG. 5 that the headstock 13 will rotate the workpiece at a medium speed when the speed control circuit between terminals 2 and 4 of the control unit 100 is completed. Thus, when the selector switch DRS is in position to energize relay KB, contact KB1 closes to complete the circuit between terminals 2 and 4 while the circuit between terminals 2 and 1 is interrupted by the opening of the normally closed contact KB2. The motor MTR5 is operated at a frequency which is controlled by potentiometer 2P which effects the medium speed rate.

When the selector switch DRS is set to energize relay KA, the circuit between terminals 2 and 11 of control unit 100 is closed while the circuit between terminals 2 and 1 are open due to the closing of contact KA1 and the opening of normally closed contact KA2. The motor MTR5 is then operated at a frequency which is controlled by potentiometer 3P which effects a fast speed rate.

It is to be understood that after the feed screw 20 contacts the positive stop 96 and movement of the piston 21 to the left is discontinued, the piston 30 will automatically be advanced at the preset feed rate to advance the wheelhead 15 and the grinding wheel 16 in a plunge grinding operation at a selected one of a slow, medium and fast feed rate, as previously described.

It is to be understood that the piston 30 serves to advance the wheelhead 15 until the handwheel 29 rotates to a position wherein a cam 101 carried thereby engages limit switch 12LS to close the same and complete the circuit to feed completion relay 54CR. When relay 54CR is energized, in a convention manner not shown, fine feed and spark out occurs and thereafter wheelhead 15 is retracted when the preset size is reached.

It is to be understood that when the workpiece has a plurality of portions of different diameters to be ground, the control system of the grinding machine 10 will be conventionally actuated so that the automatic grinding cycle is repeated after an automatic change in the diameter to be ground has been made until each of the preset diameters on each workpiece is ground to size. Means (not shown) are then provided for returning the carriage 12 to a starting position in preparation for subsequent workpieces.

It is to be understood that the grinding cycle may be stopped during the cycle either by means of a master stop pushbutton (not shown) or by positioning the infeed lever 97 to retract the wheelhead 15. When this occurs, limit switch 6LS is then opened to deenergize infeed relay 30CR and relay 31CR which holds the memory of the cycle.

It is also to be understood that the grinding machine 10 has a manual cycle. When the headstock speed switch SS4 is placed in its "B" position, the control unit 100 is shifted to its manual position and a circuit is completed from terminals 6 and 7 to terminal 2. The speed control circuit bypasses the potentiometers P1, P2 and P3 which normally automatically effect slow, medium or fast work speed rotation. The frequency of the motor MTR5 is now controllable directly by potentiometer 4P.

ALTERNATIVE WORK SPEED CONTROL

In the foregoing description of the use of the control unit 100 to control the speed of the motor MTR5 to provide for various work rotational speeds, the speed of rotation of the workpiece has been directly in proportion with the diameter of the workpiece portion being ground. However, by slightly modifying the circuitry associated with the control unit, in lieu of the speed of rotation of the workpiece being directly related to the workpiece diameter, it may be directly related to the rate of plunge feed of the grinding wheel 16. Such a circuitry is shown in FIG. 6.

Figure 6:
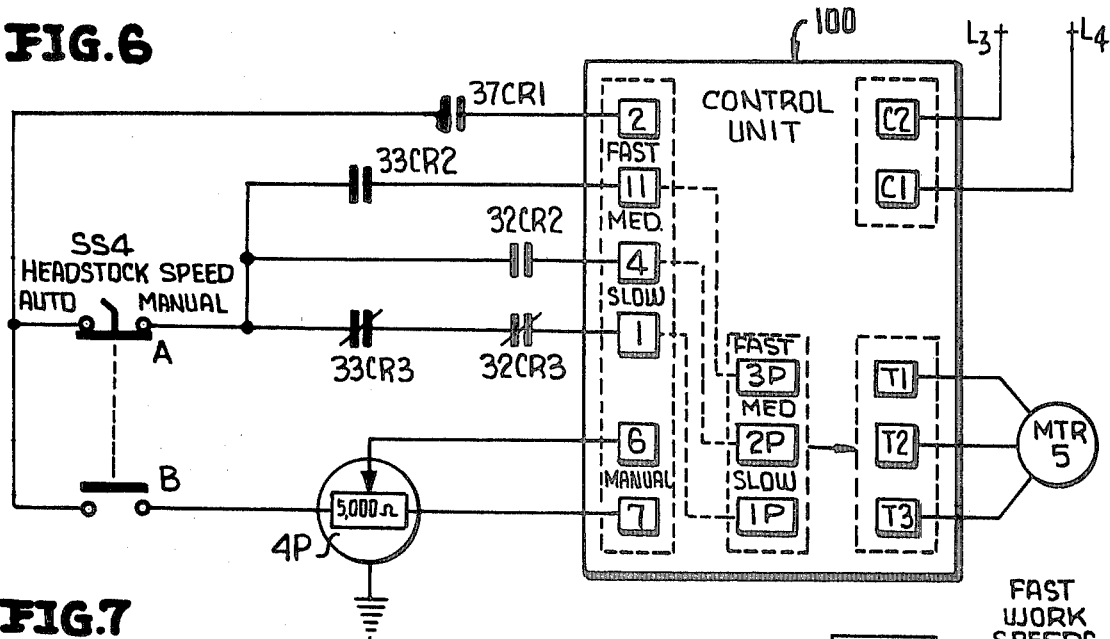
FIG. 6 is a circuit diagram of the work speed control when the same is controlled by the grinding feed rate.

It is to be noted that the circuitry of FIG. 6 incorporates the contact 37CR1 as well as a headstock speed control switch SS4.

When the switch SS4 is in its automatic or "A" position, and the relay 37CR is energized to result in the closing of the contact 37CR1, the automatic control circuit of the control unit 100 is completed. When the wheel base feed in programmed for slow feed, neither of the relays 32CR and 33CR (FIG. 4) is energized with the result that contacts 33CR3 and 32CR3 are closed and terminals 1 and 2 of the control unit 100 are connected together. Motor MTR5 is operated at a frequency which is controlled by potentiometer 1P to effect a slow speed rate.

Referring once again to FIG. 4, it will be seen that when contact K7 is closed calling for a medium feed rate of the wheel head 15, relay 32CR is energized while relay 33CR remains open. As a result, in the control circuit of FIG. 6, contact 32CR2 closes and contact 32CR3 opens. This results in terminals 2 and 4 of the control unit 100 being connected. Motor MTR5 is operated at a frequency which is controlled by potentiometer 2P to effect a medium speed rate.

In a like manner, when the grinding machine 10 is programmed to provide for a fast feed rate of the wheelhead 15, contact K6 is closed, energizing relay 33CR. At the same time, relay 32CR remains deenergized. As a result, in the circuitry of FIG. 6, contact 33CR2 closes while contact 33CR3 opens. As a result, terminals 2 and 11 of the control unit 100 are connected. Motor MTR5 is operated at a frequency which is controlled by potentiometer 3P to effect a fast speed rate.

It will also be apparent that in the circuitry of FIG. 6, when the headstock speed switch SS4 is set in its manual or "B" position, the speed of the motor MTR5 is manually controlled through adjustable potentiometer 4P.

From the foregoing, it will be readily apparent that the grinding machine 10 may be programmed to vary the feed rate of the wheelhead 15 and the grinding wheel 16 during the plunge advance thereof in accordance with the diameter of the workpiece portion being ground. In addition, the grinding machine may be programmed to automatically vary the speed of rotation of the workpiece in accordance with either the diameter of the workpiece portion being ground or the plunge feed rate of the wheelhead. By providing automatically variable wheelhead advance feed rates and work rotational speeds, it will be readily apparent that the grinding machine 10 may automatically be adjusted to provide for a maximum efficiency grinding operation as well as a controlled fine finish of the ground workpiece.

I claim:

1. In a machine tool particularly adapted to effect the removal of stock from rotating workpieces wherein workpiece portions of different diameters are to be machined, drive means for rotating a workpiece, feed means for progressively relatively transversely feeding a workpiece and a machining element, control means for controlling the relation of the speed of rotation of a workpiece portion being machined and the relative transverse feeding movement rate.

2. The machine tool of claim 1 wherein said control means includes means responsive to workpiece diameter.

3. The machine tool of claim 1 wherein said control means includes a caliper mounted for engagement with a workpiece portion in advance of machining to quality same.

4. The machine tool of claim 1 wherein said control means includes means for automatically programming said machine tool to machine different workpiece portions to predetermined diameters.

5. The machine tool of claim 1 wherein said feed means includes selector means for selectively effecting said relative transverse feeding at different rates.

6. The machine tool of claim 1 wherein said feed means includes selector means for selectively effecting said relative transverse feeding at different rates, including a slow feed, a medium feed, and a fast feed, said feed means being effective to automatically provide a slow feed unless said selector means is in condition to effect a selected one of said medium feed and said fast feed.

7. The machine tool of claim 1 wherein said feed means includes selector means for selectively effecting said relative transverse feeding at different rates, said feed means being of a fluid-operated type and including throttle valves for controlling rate of fluid flow, and valve means for selectively directing operating fluid to said throttle valves.

8. The machine tool of claim 1 wherein said drive means includes a variable speed drive unit and speed control means operative for selectively controlling said variable speed drive unit to effect rotation of a workpiece portion at a predetermined rate in accordance with the diameter thereof.

9. The machine tool of claim 8 wherein said variable speed drive unit has a slow speed, a medium speed, and a fast speed, said speed control means having a normal slow speed and capable of being set to provide for medium speed and said fast speed.

10. The machine tool of claim 1 wherein said drive means includes an electric motor having a plurality of different rotational speeds as determined by a control unit, and means for automatically setting said control unit in accordance with the diameter of the workpiece portion to be machined.

11. The machine tool of claim 10 wherein said control unit has a manual control position and means for manually operating said electric motor through a range of speeds.

12. The machine tool of claim 1 wherein said control means includes means for automatically selecting the workpiece speed of rotation in accordance with the rate of relative transverse feeding movement.

13. The machine tool of claim 1 wherein said machine tool is a grinding machine and said machining element is a grinding wheel.

14. A grinding machine particularly adapted for the programmed grinding of workpiece portions of different diameters, said grinder including a base, work supports mounted on said base for supporting a workpiece to be ground, at least one of said work supports being mounted for rotation and drive means connected to said one work support for rotating said one work support and a workpiece carried thereby at preselected speeds, a wheel support mounted on said base for transverse movement, a grinding wheel mounted on said wheel support for rotation in a transverse plane, feed means for advancing said wheel support and said grinding wheel for effecting a grinding operation, a caliper for engaging and measuring a workpiece portion aligned with said grinding wheel, said grinding machine further comprising control means for automatically selecting the speed of workpiece rotation and grinding wheel infeed in accordance with the diameter of the workpiece portion to be ground.

15. The grinding machine of claim 14 wherein said control means includes data receiving means operative to preset said feed means to grind a workpiece portion to a preset diameter.

16. The grinding machine of claim 14 wherein said feed means includes a hydraulic motor for advancing said grinding wheel to effect the grinding of a workpiece portion, and said control means including fluid supply control means selectively operable for directing fluid to said hydraulic motor at a selected one of several predetermined rates to advance said grinding wheel at a predetermined rate in accordance with the diameter of the workpiece portion being ground.

17. The grinding machine of claim 16 wherein said fluid supply control means includes a plurality of throttle valves, and flow control valves for selectively directing fluid through said throttle valves to said hydraulic motor.

18. The grinding machine of claim 14 wherein said drive means includes a variable speed power unit, and said control means includes a control unit connected to said power unit for effecting the operation of said power unit at preselected speeds, and means operative in response to the setting of said grinding machine to grind a workpiece to a predetermined diameter to actuate said control unit to operate said power unit at a predetermined speed in accordance with the predetermined diameter.

19. The grinding machine of claim 18 wherein said control unit has a manual control position, and means for manually controlling said power unit to operate at a selected speed when said control unit is in said manual control position.

20. The grinding machine of claim 14 wherein said control means includes means for selecting the speed of workpiece rotation in accordance with the rate of grinding wheel infeed.